Figure 3:
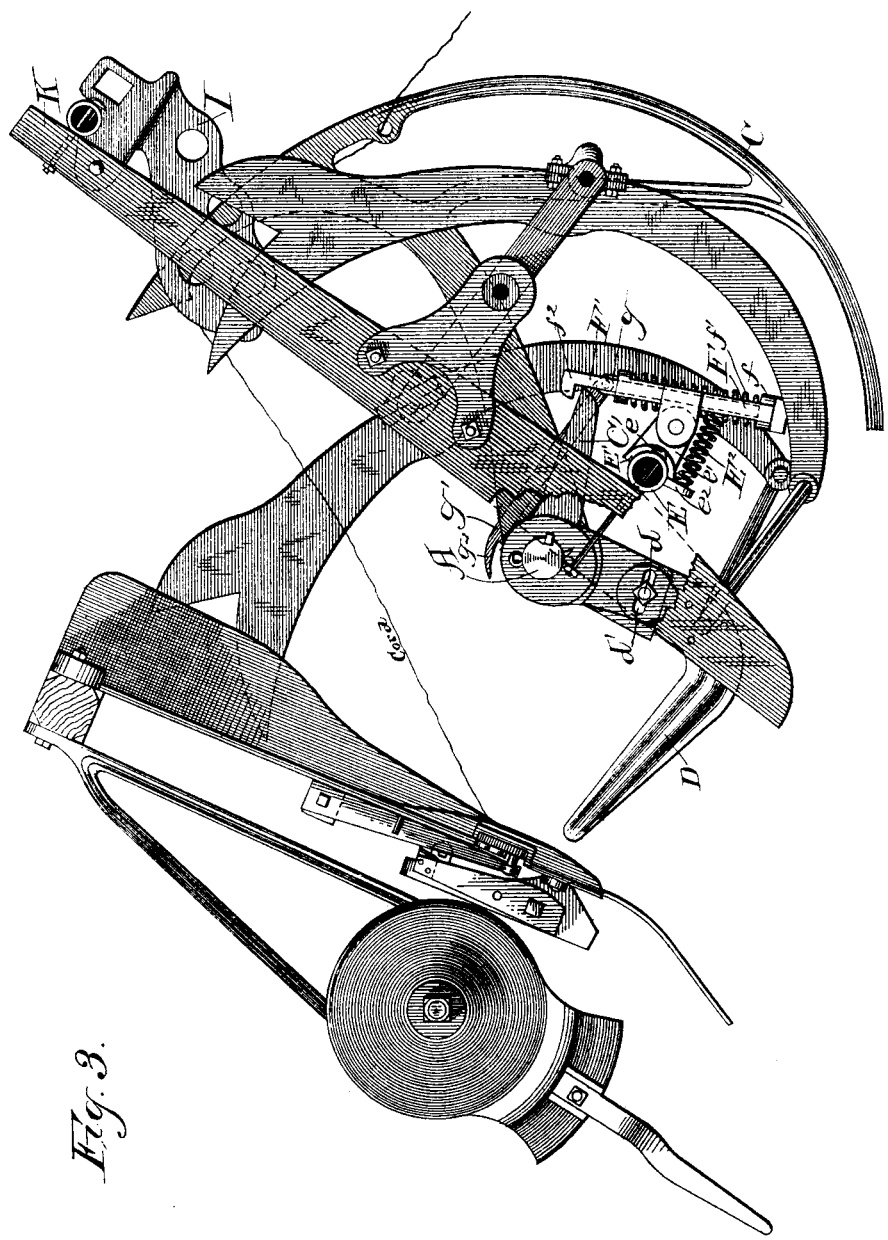

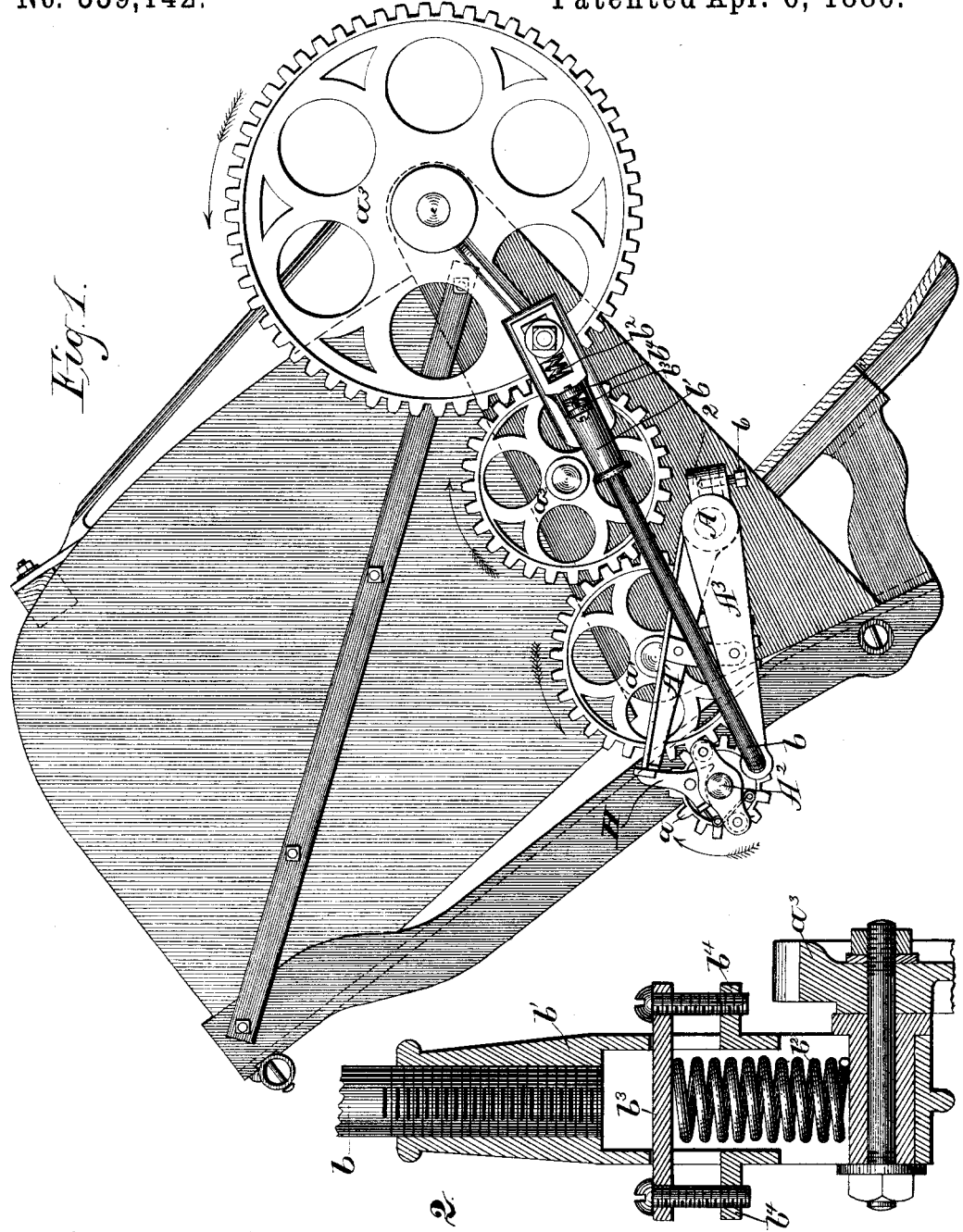

(No Model.) 6 Sheets—Sheet 2.
J. P. BULLOCK.
GRAIN BINDER.

No. 339,142. Patented Apr. 6, 1886.

Witnesses.
Inventor:
Joseph P. Bullock
By Short & Underwood
Attorneys

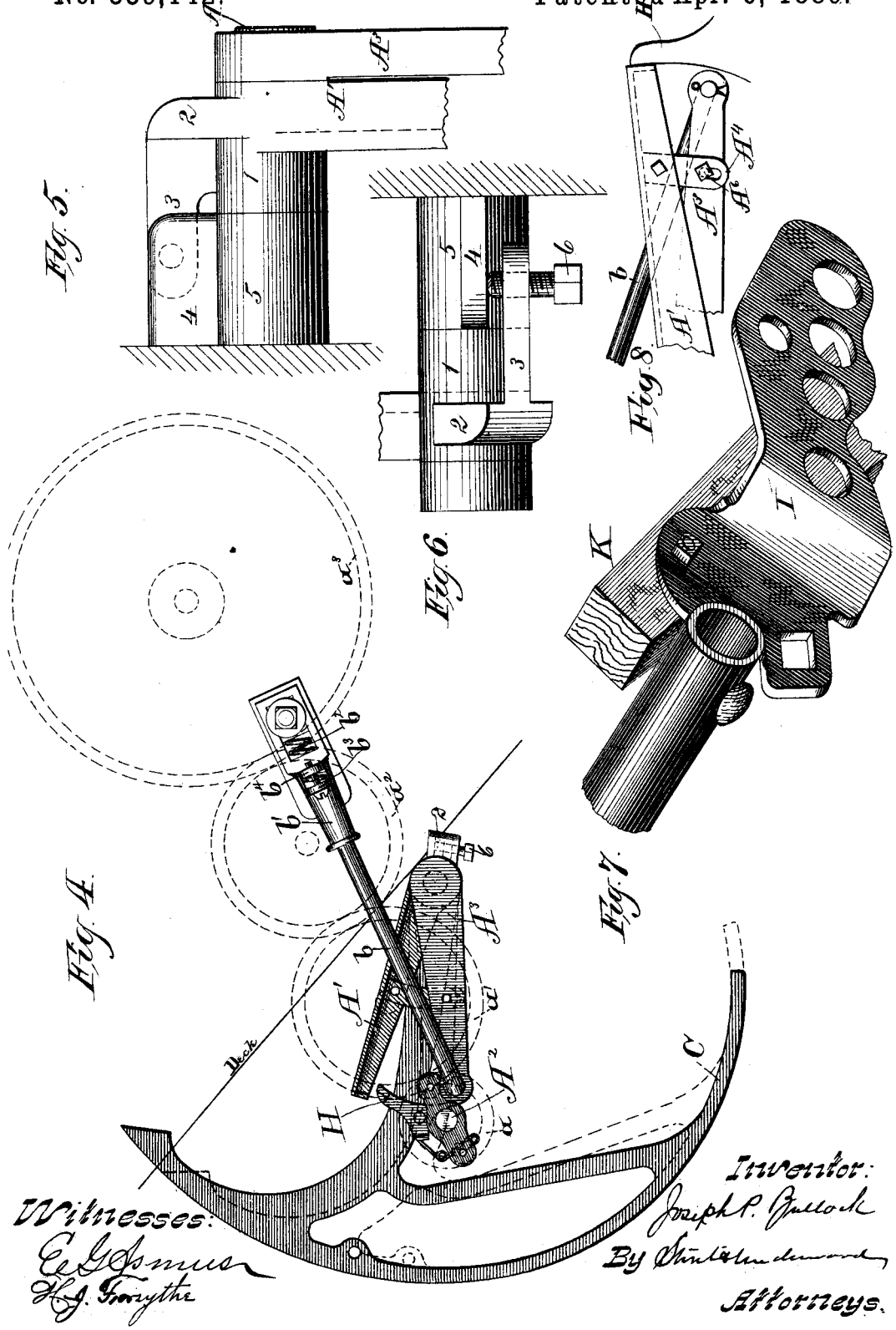

(No Model.)  6 Sheets—Sheet 4.
J. P. BULLOCK.
GRAIN BINDER.
No. 339,142.  Patented Apr. 6, 1886.
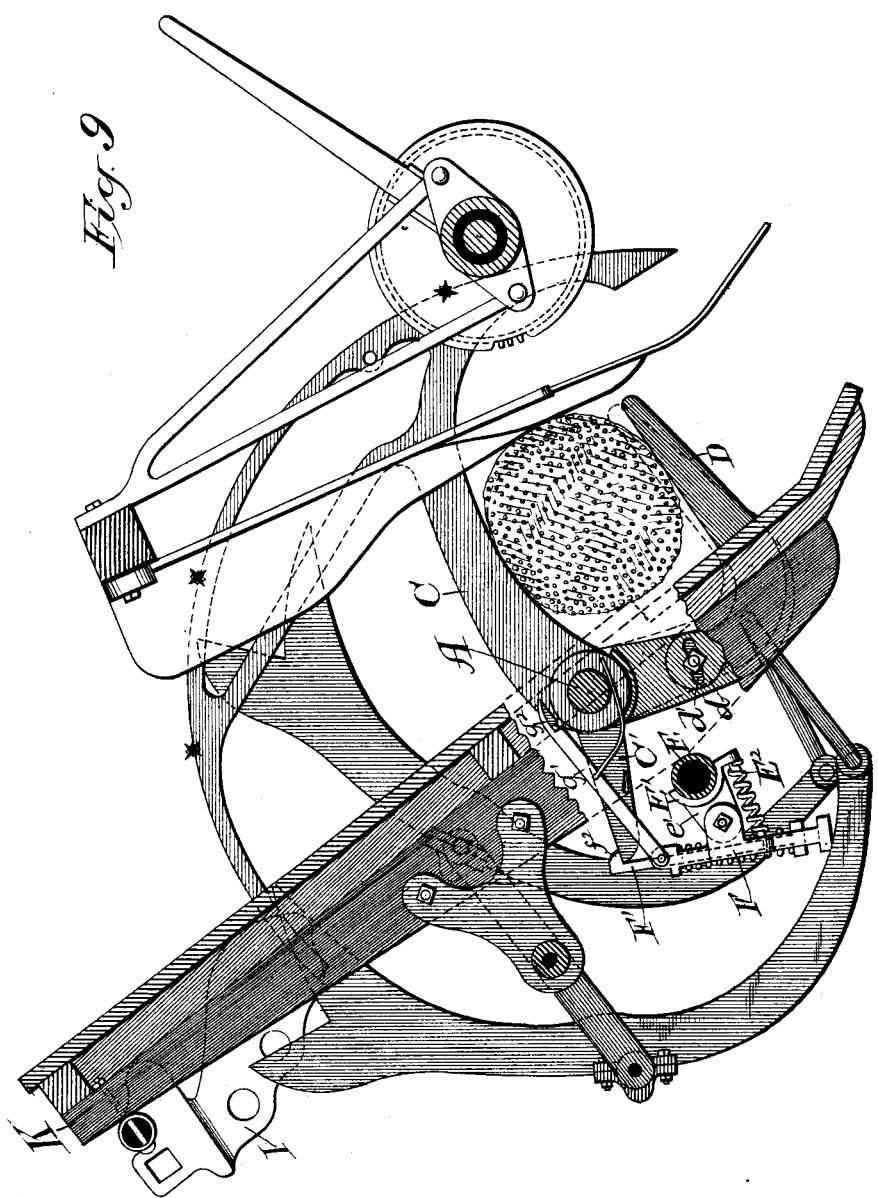

(No Model.) 6 Sheets—Sheet 5.
J. P. BULLOCK.
GRAIN BINDER.
No. 339,142. Patented Apr. 6, 1886.
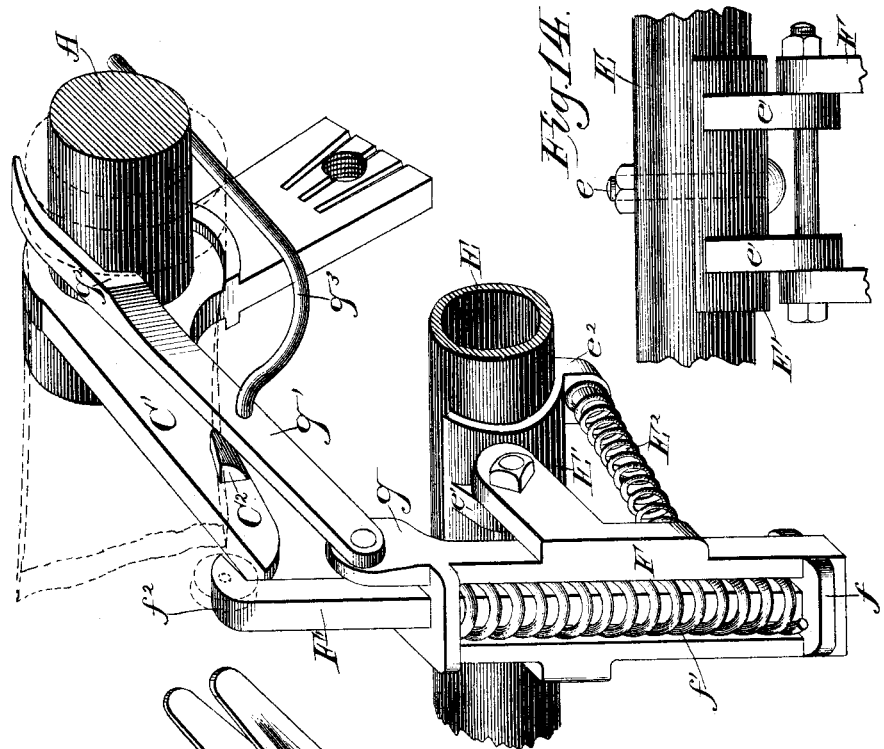
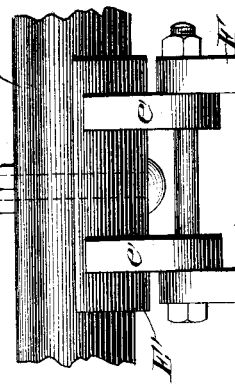
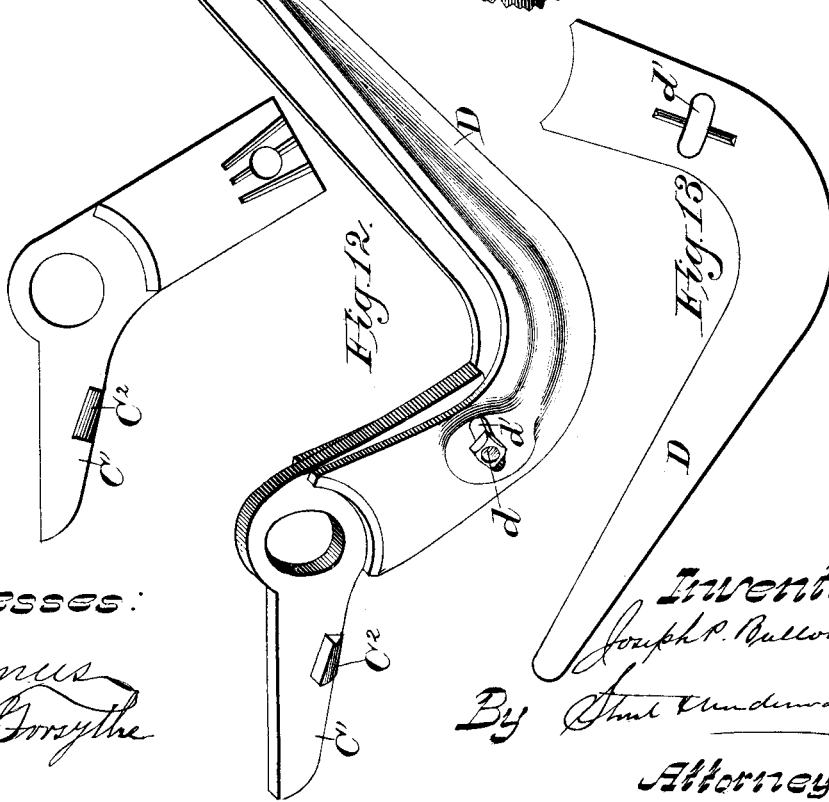
Witnesses:
E. J. Asmus
H. J. Forsythe
Inventor:
Joseph P. Bullock
By Thur. Underwood
Attorneys.

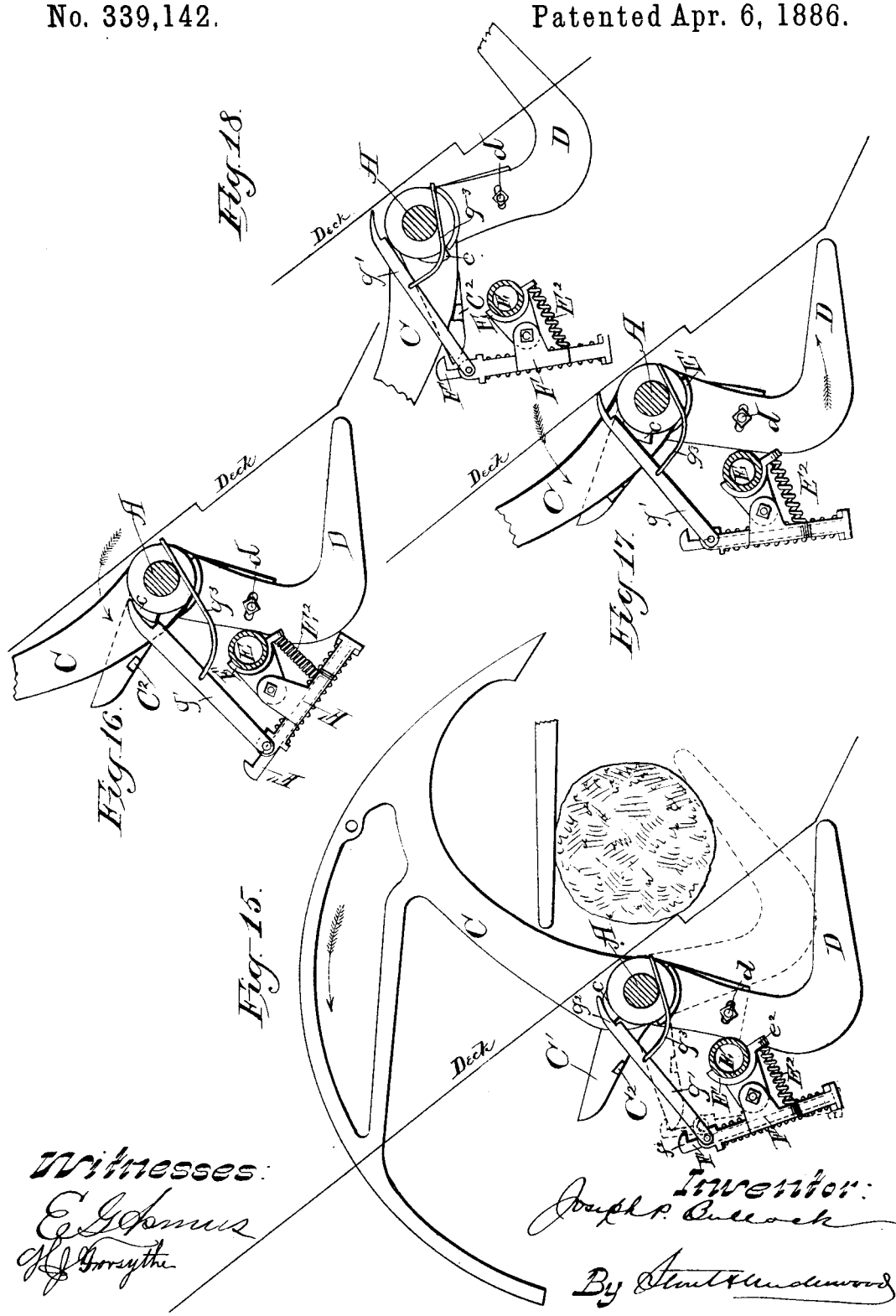

UNITED STATES PATENT OFFICE.

JOSEPH P. BULLOCK, OF MILWAUKEE, WISCONSIN, ASSIGNOR TO THE DENNETT HARVESTING MACHINE COMPANY (LIMITED) AND THE MILWAUKEE HARVESTER COMPANY, BOTH OF SAME PLACE.

GRAIN-BINDER.

SPECIFICATION forming part of Letters Patent No. 339,142, dated April 6, 1886.

Application filed July 31, 1884. Serial No. 139,323. (No model.)

*To all whom it may concern:*

Be it known that I, JOSEPH P. BULLOCK, of Milwaukee, in the county of Milwaukee, and in the State of Wisconsin, have invented certain new and useful Improvements in Grain-Binders; and I do hereby declare that the following is a full, clear, and exact description thereof.

My invention relates to grain-binders, and will be fully described hereinafter.

In the drawings, Figure 1 is an elevation of the rear end of a binder embodying my invention. Fig. 2 is a section of a portion of the link that connects the main wheel on the tyer-operating shaft with the crank-arm of the needle-shaft. Fig. 3 is an elevation of the compressing and tying mechanism as seen from the front end of the machine while the packers are accumulating grain upon the compressor and the needle is at rest. Fig. 4 is an elevation of the needle and mechanism for tripping it into action. Figs. 5, 6, 7, and 8 are details of parts of my device. Fig. 9 is an elevation of the parts shown in Fig. 3, but from the rear end of the machine. Figs. 10, 11, 12, 13, and 14 are details showing the connection between the compressor-spring and compressor-arm. Fig. 15 is a detail view showing the position of the needle and trip-arm or compressor, the latter being shown in dotted lines when the bundle is just ready to be discharged, and said trip arm or compressor in full lines immediately after the discharge of the bundle. Figs. 16, 17, and 18 show various positions of the needle and compressor after discharging.

A is the needle-shaft, on the driving end of which it carries a clutch-trip stop, A', which acts to trip the clutch connecting the pinion $a$ with the driving-shaft A$^2$, the driving-shaft being connected by gearing $a'$ $a^2$ with the large gear-wheel $a^3$ on the tyer-operating shaft. The needle-shaft also carries a crank-arm, A$^3$, the outer end of which is connected by a link, $b$ $b'$, with the rim of gear-wheel $a^3$. This link is made in two parts, $b$ $b'$, and a wrist is bolted to the gear-wheel $a^3$ passes through an opening made for it in head part, $b'$, and bears upon a block and spring, $b^2$, as shown in detail, Fig. 2, that in turn is supported by a plate, $b^3$, and screws that pass through plate $b^3$ into flanges $b^4$ $b^4$ on the head $b'$, and thus the connection between the wheel $a^3$ and needle-shaft is made yielding. The clutch-trip stop A' has a hub, 1, that works loosely on the needle-shaft, and this hub has formed upon it a lug, 2, from which an arm, 3, projects parallel with a flange, 4, on the boss 5 on the frame, through which the needle-shaft passes, and an adjusting-screw, 6, passes through a threaded opening in arm 3 and impinges against flange 4. The needle C is keyed to the shaft A, and a bell-crank, C', is slipped loosely onto the shaft A and lies close up against one side of the needle. This bell-crank has a lug, C$^2$, on its upper arm, that projects beneath the back edge of the needle, and the lower arm of this bell-crank C' has bolted to it the two-part trip-arm D, the bolt $d$, that secures them, passing through curved slots $d'$ in the trip-arm, by which the angle of the arm D to its supporting bell-crank may be adjusted to give bundles of different sizes. The butt-ends of the parts forming the trip-arm are concaved to fit snugly against the needle-shaft. E is one of the tubular supporting-bars that tie the binding-frame to the harvester, and to this bar, at a point about under the tripping-arm, I secure a bracket, E', by a bolt, $e$. This bracket has two lugs, $e'$ $e'$, projecting from it, to which I hang a frame, F. This frame is also connected with a lug, $e^2$, on bracket E', below its hinge, by a spring, E$^2$. The frame F carries a sliding plate, $f$, to which a catch, F', is secured after it has been passed down through a spiral spring, $f'$, and the head $f^2$ of this catch stands in position to engage with the inner end of bell-crank C'. The frame F has a lug, $g$, that projects up from it parallel with the catch, and to this is pivoted a finger, $g'$, the free end of which is slightly curved and provided with a shoulder at $g^2$. This finger also carries a spring, $g^3$, that projects beneath the needle-shaft, and has a tendency to hold it down on said shaft, as shown, for instance, in Fig. 18 of the drawings. The hub of the needle is provided with a lug, $c$, for the finger $g'$ to engage with when the needle is on its return.

The operation of my device is as follows: When the needle is at rest and is just ready to start, it is in the position shown in Fig. 4 in dotted lines, its back edge resting upon lug $C^2$ of the bell-crank $C'$. Here it rests until a sufficient amount of grain has been accumulated upon the compressor trip-arm D to overcome the weight of the needle, which, as before stated, is borne by the lug $C^2$ on the bell-crank $C'$, and when this occurs the needle will be started forward far enough to partially revolve its shaft, and through it lift the clutch-trip stop $A'$, so as to free it from the clutch-pawl H on a pinion, $a$, loose on the driving-shaft, and by connecting the pinion to the shaft thus throw the machine into operation. After this the weight of the accumulating grain as it is packed against the compressor will be taken by the catch $F'$ until the needle has encircled the gavel and has taken the twine into the knotter, and by this time the lug $c$ on the hub of the needle will have passed under the finger $g'$ and beyond its shoulder. Therefore, as the needle returns after tying the knot, the lug $c$ will abut against the shoulder $g^2$, thrust the finger back to throw the head $f^2$ of catch $F'$ out of engagement with the end of the bell-crank $C'$, which, when released at this point, will permit arm D to fall into the position shown in full lines, Fig. 15, as the bundle is discharged.

To prevent the cord from entangling with the packer adjacent to it, I provide a shield, I, which I secure to the upper end of beam K in such a position as to extend down between the line of travel of the needle and packer points. The clutch-trip stop $A'$ and crank-arm $A^3$ lie at an acute angle to each other, and are connected midway of their length by a strap, $A^4$, which is slotted in its lower end to take a securing-bolt, $A^6$; and when it is desired to make the trip more or less sensitive the bolt $A^6$ is loosened and the adjustment made by means of adjusting-screw 6, after which bolt $A^6$ is again tightened.

Having thus described my invention, what I claim as new, and desire to secure by Letters Patent, is—

1. The combination, with the needle having a lug at or near its hub, of the bell-crank carrying the compressor upon one arm, a spring-catch for engagement with the inner end of the other arm of the bell-crank while the bundle is being compressed, and a finger connecting the lug of the needle with the frame of the spring-catch, for tripping the bell-crank and allowing the compressor to fall, as and for the purpose set forth.

2. The frame F and the bracket to which it is pivoted, in combination with spring $E^2$, spring-catch $F'$, arm $C'$, finger $g'$, needle having lug $c$, and compressor, as and for the purpose set forth.

3. The combination of the frame F, bracket $E'$, spring $E^2$, spring-catch $F'$, arm $C'$, finger $g'$, and spring $g^3$, as and for the purpose set forth.

In testimony that I claim the foregoing I have hereunto set my hand, at Milwaukee, in the county of Milwaukee and State of Wisconsin, in the presence of two witnesses.

JOSEPH P. BULLOCK.

Witnesses:
  STANLEY S. STOUT,
  H. G. UNDERWOOD.